United States Patent
Avati et al.

(10) Patent No.: US 8,874,626 B2
(45) Date of Patent: Oct. 28, 2014

(54) TRACKING FILES AND DIRECTORIES RELATED TO UNSUCCESSFUL CHANGE OPERATIONS

(71) Applicant: Red Hat, Inc., Raleigh, NC (US)

(72) Inventors: Anand Vishweswaran Avati, Mysore (IN); Pranith Kumar Karampuri, Jeedimetla (IN)

(73) Assignee: Red Hat, Inc., Raleigh, NC (US)

( * ) Notice: Subject to any disclaimer, the term of this patent is extended or adjusted under 35 U.S.C. 154(b) by 33 days.

(21) Appl. No.: 13/757,437

(22) Filed: Feb. 1, 2013

(65) Prior Publication Data

US 2014/0222878 A1 Aug. 7, 2014

(51) Int. Cl.
G06F 12/00 (2006.01)
G06F 17/30 (2006.01)

(52) U.S. Cl.
CPC .............................. *G06F 17/30194* (2013.01)
USPC ......................................... 707/827; 707/828

(58) Field of Classification Search
USPC ....................................................... 707/827
See application file for complete search history.

(56) References Cited

U.S. PATENT DOCUMENTS

| | | | |
|---|---|---|---|
| 5,951,649 A | 9/1999 | Dobbins et al. | |
| 6,629,110 B2 * | 9/2003 | Cane et al. | 707/703 |
| 7,418,439 B2 | 8/2008 | Wong | |
| 7,624,443 B2 * | 11/2009 | Kramer et al. | 726/22 |
| 7,890,469 B1 * | 2/2011 | Maionchi et al. | 707/654 |
| 8,117,294 B2 * | 2/2012 | Pollakowski et al. | 709/223 |
| 2003/0159006 A1 | 8/2003 | Frank et al. | |
| 2003/0163568 A1 | 8/2003 | Kano et al. | |
| 2005/0071708 A1 * | 3/2005 | Bartfai et al. | 714/5 |
| 2012/0330894 A1 | 12/2012 | Slik | |

OTHER PUBLICATIONS

USPTO Office Action for U.S. Appl. No. 13/686,091, mailed Jan. 30, 2013.
Gluster Inc., "Gluster Filesystem Unified File and Object Storage—Beta 2", Published Aug. 2011, pp. 1-27, Available at <http://hypnotoad.uchicago.edu/roll-documentation/glusterfs/6.0/Gluster_Unified_File_and_Object_Storage.pdf>, retrieved Jan. 18, 2013.
Business Wire, "Gluster Announces Apache Hadoop Storage Compatibility in Latest GlusterFS Release", Published Aug. 23, 2011, Available at <http://www.businesswire.com/news/home/20110823005899/en/Gluster-Announces-Apache-Hadoop-Storage-Compatibility-Latest>, retreived Jan. 18, 2013.
USPTO Office Action for U.S. Appl. No. 13/555,718, mailed Jan. 30, 2013.

* cited by examiner

*Primary Examiner* — Pavan Mamillapalli
(74) *Attorney, Agent, or Firm* — Lowenstein Sandler LLP (57) ABSTRACT

A server computer system identifies change operations for an object in a file system. The object can be a file or a directory. The change operations can include a change to a local copy of the object and one or more remote copies of the object. The server computer system determines that one of the change operations is unsuccessful and creates tracking data that identifies the object that is associated with at least one change operation that is unsuccessful.

20 Claims, 6 Drawing Sheets

TRACKING FILES AND DIRECTORIES RELATED TO UNSUCCESSFUL CHANGE OPERATIONS

TECHNICAL FIELD

The present disclosure relates to file systems, and more particularly, to tracking files and directories related to unsuccessful change operations.

BACKGROUND

Data may be stored as unstructured data, for example, in files and directories in a file system. A distributed file system may store multiple copies of a file and/or directory on more than one storage server machine to help ensure that, in case of a hardware failure and/or system failure, the data should still be accessible. If a storage server machine experiences a failure, the storage server machine may be unavailable, but changes can still be made to the data on the copies of the data on the available storage server machines. The data on the storage server machine that is down may be stale, which is data that no longer is a current version of the data. When the failed storage server machine is powered back up, the changes which were made to the other copies of the data should be propagated to the failed storage server machine. The process of updating the stale data on the storage server machine may be known as "self-healing."

In traditional self-healing solutions, a computing machine typically crawls the entire file system to determine which files and/or directories should be self-healed. The computing machine generally checks the change log for each of the files and/or directories to determine whether a particular file or directory has stale data and should be self-healed. Generally, the conventional solutions of examining the change logs only identifies which directories and/or files should be self-healed at the file and directory level itself. Traditionally, the use of change logs do not provide information at a higher level, such as the volume level, to identify which files and/or directories for a given volume should be self-healed without having to crawl the entire volume and inspect each change log for the files and directories in the volume. Some volumes may have up to two billion files, and the examination of each change log can be a time consuming and resource intensive process.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and system for tracking file system objects (e.g., files, directories, sub-directories) that are related to unsuccessful change operations, according to various implementations. Examples of a change operation can include, and are not limited to, modifying content of a file, deleting a file, creating a file, etc. A cluster of storage servers may store copies of data to help prevent data loss. A cluster can be a set of linked storage servers working together closely. For example, machines A-D may host storage servers in a cluster and may store a copy of a File-XYZ. Storage-Server-Machine-A may change the local copy of File-XYZ and the change can be replicated to the copies of File-XYZ on Storage-Server-Machines B,C,D. Storage-Server-Machine-B may experience a system failure and may not replicate the change to its local copy of File-XYZ. File-XYZ on Storage-Server-Machine-B may be a stale copy of data and copies of File-XYZ on Storage-Server-Machine-A, Storage-Server-Machine-C, and Storage-Server-Machine-D may be fresh copies of the data. A fresh copy of a file contains the most current version of the data of the file. A stale copy of a file does not contain the most current version of the data of the file. When Storage-Server-Machine-B is back up and running and re-connecting to the cluster of storage servers, the stale File-XYZ on Storage-Server-Machine-B should be updated. A storage server that is connecting to a cluster of storage servers is hereinafter referred to as a "recoverable storage server." The process of updating the data on the recoverable storage server machine to reflect the current version of the data is hereinafter referred to as "self-healing." Self-healing can include overwriting stale data in a file with current data.

Implementations of the present disclosure use server machines that host tracking modules, which are described in greater detail below, to track unsuccessful change operations. Implementations also track successful change operations. The tracking module can create data indicating which files and/or directories were associated with change operations that failed. For example, the tracking module can create a list of files and/or directories that are associated with unsuccessful change operations. A file system component, such as a pro-active self-healing subsystem, can use the data from the tracking module to identify which files and/or directories should be self-healed without having to crawl through all of the files and directories in the entire file system or in a volume to determine which files and/or directories should be self-healed.

Figure 1:
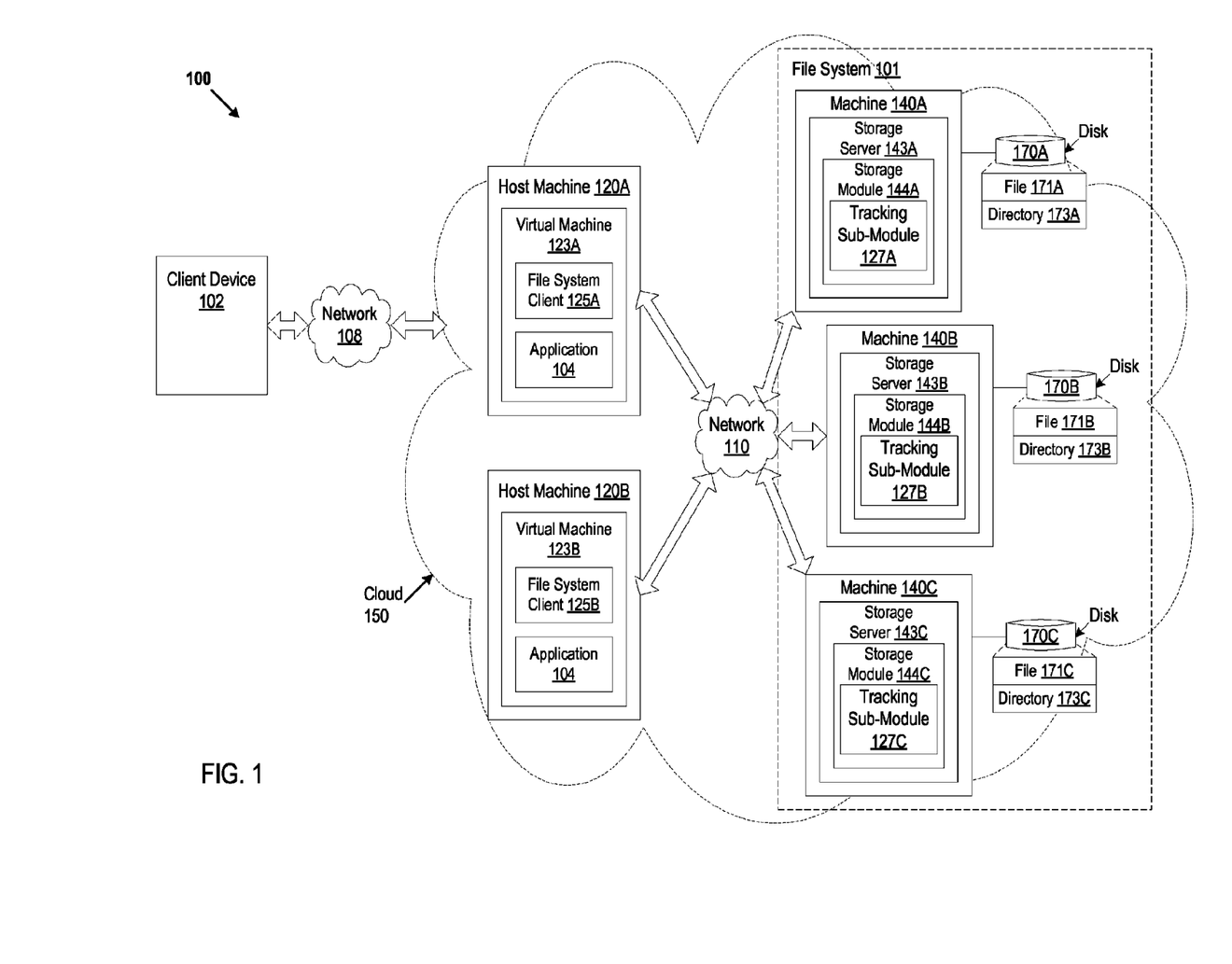
FIG. 1 illustrates an example system architecture, in accordance with various implementations.

FIG. 1 is an example system architecture 100 for various implementations. The system architecture 100 can include a distributed file system 101 coupled to one or more client devices 102 and host machines 120A-B via one or more networks 108,110. The networks 108,110 may be a public network, a private network, or a combination thereof. The distributed file system 101 can be a network attached storage file system that includes one or more machines 140A-C and one or more mass storage devices, such as magnetic or optical storage based disks 170A-C, solid-state drives (SSDs) or hard drives, coupled to the machines 140A-C via the network 110.

The system architecture 100 can include a cloud 150 which can provide virtual machines, such as virtual machines 123A-B. There can be one or more virtual machines 123A-B in the cloud 150. The virtual machines 123A-B can be hosted on a physical host machine 120A-B configured as part of the cloud 150. For example, virtual machines 123A-B may be respectively hosted on host machines 120A-B in cloud 150. The host machines 120A-B can communicate to each other via the network 110. The host machines 120A-B can be located in a data center. The cloud 150 can be provided by a cloud provider. In one implementation, the distributed file system 101 is also part of the cloud 150. The distributed file system 101 can store data as files (e.g., files 171A-C) on storage devices (e.g., disks 170A-C) and can include directories (e.g., directories 173A-C), that are virtual containers within the file system 101, in which groups of computer files and possibly other directories can be kept and organized. Files that are related can be stored in the same directory.

A machine 140A-C can include a storage server 143A-C to manage access to the files 171A-C and directories 173A-C that are stored in the file system 101. The storage servers 143A-C can include a storage module 144A-C to handle access requests. One or more host machines 120A-B can include a file system client 125A-B to communicate with the storage servers 143A-C in the file system 101. Examples of file system clients 125A-B can include, and are not limited to, native file system clients and network file system (NFS) clients. "Native" can describe support for specific operating systems. For example, a native file system client may be, and is not limited to, a file system client that supports the Linux operating system.

Users can interact with applications 104 executing on the virtual machines 123A-B using client computer systems, such as client device 102. The client device 102 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. An application 104 can be any type of application including, for example, a web application, a desktop application, a database management application, a browser application, etc. Client devices 102 can be connected to host machines 120A-B via a network 108. An application 104 may request access (e.g., read, write, etc.) to the files 171A-C and/or directories 173A-C in the file system 101 via a file system client 125A-B.

Multiple copies of the data (e.g., file 171A-C, directories 173A-C) in the file system 101 can be stored on the disks 170A-C for redundancy to prevent data loss. For example, files 171A-C may be copies of the same file, and directories 173A-C may be copies of the same directory. The storage servers 143A-C can be clustered in a replication domain to store the multiple copies of data (e.g., data files 171A-C, directories 173A-C) on various disks 170A-C to prevent data loss in case one of the storage servers 143A-C and/or machines 140A-C becomes unavailable, for example, due to a system failure or a hardware failure.

The storage servers 143A-C can manage the data (e.g., files 171A-C, directories 173A-C) being replicated in the cluster using a replication directory hierarchy, which is a directory structure that contains the files and directories being replicated amongst the clustered storage servers 143A-C. The storage servers 143A-C can propagate any changes that are made to the files and directories in their corresponding replication directory hierarchy to the other copies of the files and/or directories that are stored on the other disks and/or managed by other storage servers 143A-C. For example, disk 170A may store a file 171A. A copy of file 171A may be stored on disk 170B and disk 170C. When a change is made to file 171A, the storage server 143A can contact storage server 143B to make the same change to file 171B, and can contact storage server 143C to make the same change to file 171C. Examples of changes can include, and are not limited to, creation of a file, deletion of a file, rename of a file, update to the content of a file, etc.

Before a change is performed on a local copy of a file or directory or a remote copy of the file or directory, the storage servers that are making the change can create or update a local change log of the file or the directory to reflect the change operations. In one implementation, the change logs are tuples that contain elements representing copies of the file or directory. For example, there may be three copies of a file (e.g., file 171A, file 171B, file 171C) on three storage servers (e.g., storage server 143A, storage server 143B, storage server 143C). The change log for each copy of the file can be a tuple that contains three elements. Each element in the change log can be a count representing a pending change operation that is associated with the file or directory. For example, if there is a change to be made to file 171A, file 171B, and file 171C, the counts in the change log for each file may be incremented to (1,1,1), where the first element corresponds to the change being made to file 171A, the second element corresponds to the change being made to file 171B, and the third element corresponds to the change being made to file 171C. The change log can be stored as an extended attribute in the file or the directory. The change log can store values that represents counts of change operations for the copies of the file or directory. Implementations of updating the counts in the change logs are described in greater detail below in conjunction with FIG. 2 and FIG. 3.

When the change is made to file 171A and successfully replicated to file 171B and file 171C, the storage servers 143A-C can update the local change logs to reflect the successful change operations. For example, the storage servers 143A-C can decrement the change log values to (0,0,0) to represent that the change operations for file 171A, file 171B, and file 171C are successful and that there are no pending change operations related to any of the copies of the file.

The storage servers 143A-C can also create and/or update a change log for a directory (e.g., directory 173A-C), for example, when there is a change being made to a directory and copies of the directory. Examples of a change to a directory can include, and are not limited to, a file being created in a directory, a file being deleted in a directory, etc. A directory (e.g., directory 173A-C) can have a change log that includes counts representing change operations that are associated with changing a file in the directory.

The storage servers 143A-C can include a tracking sub-module 127A-C to track unsuccessful change operations associated with a file and/or directory. In one implementation, the storage modules 114A-C include the tracking sub-modules 127A-C. There can be tracking data for each storage server 143A-C. The tracking module 127A-C can create tracking data that describes which files and/or directories are associated with unsuccessful change operations. In one implementation, the tracking data is a list of file system object identifiers. Examples of file system objects can include, and are not limited to, files, directories, sub-directories, etc. For example, the tracking data for storage server 143A can be a list of file identifiers and/or directory identifiers that are related to unsuccessful replication operations. Storage server 143B and storage server 143C can each have tracking data for files and/or directories being managed by the respective storage server. The tracking sub-modules 127A-C can use the change log values to create the tracking data. The tracking sub-modules 127A-C can detect when the change log values are modified and update the tracking data based on the modification. For example, when the tracking sub-module 127A-C reads at least one non-zero value in a change log, the tracking sub-module 127A-C can add the file identifier that corresponds to the change log to the tracking data. When the tracking sub-module 127A-C reads all zero values in a change log, the tracking sub-module 127A-C can remove the file identifier that corresponds to the change log from the tracking data. Implementations of creating and updating tracking data based on the change log values are described in greater detail below in conjunction with FIG. 2 and FIG. 3.

The tracking data can be provided to another file system component, such as a pro-active self-healing subsystem. The pro-active self-healing subsystem can identify from the tracking data which files and/or directories should be self-healed without having to crawl the entire file system or having to crawl the entire replication directory hierarchy. When the file and/or directory is self-healed, the pro-active self-healing subsystem can modify the change log value to reflect the successful self-heal of the file or directory. The tracking module (e.g., tracking module 127A) can detect the change log being updated, may read all zero values in the updated change log, and can remove the object identifier for the file or directory from the tracking data to indicate that the fir or directory is no longer associated with an unsuccessful change operation.

Figure 2:
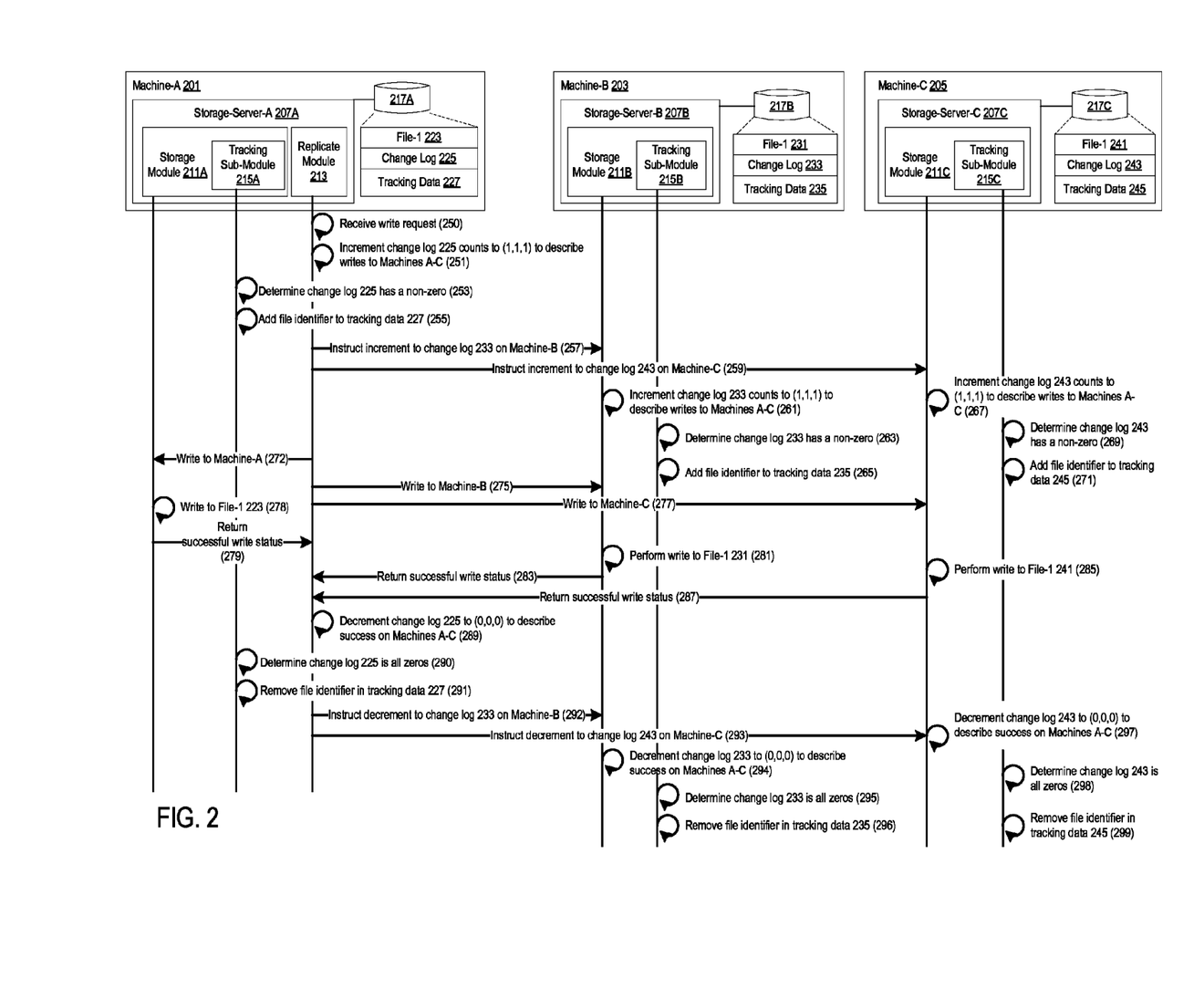
FIG. 2 is a block diagram of an implementation of a tracking module for tracking file system objects related to successful change operations.

FIG. 2 is a block diagram of an implementation of a tracking sub-modules 215A-C tracking file system objects (e.g., files, directories) that are being changed and having the change replicated to other storage servers. The machines 201,203,205 may correspond to the machines 140A-C of FIG. 1. The tracking sub-modules 215A-C may correspond to tracking sub-modules 127A-C in storage servers 143A-C in machines 140A-C of FIG. 1. Note that in alternative implementations, the functionality of one or more of the modules and/or sub-modules can be combined or divided.

The Storage-Server-A 207A can include a replicate module 213 to receive requests for access (e.g., read, write, etc.) to files (e.g., File-1 223) from file system clients (e.g., file system client 125A-B in FIG. 1). The replicate module 215A may receive (250) a write request from a file system client to write data to File-1 223 that is stored in a data store 217A that is coupled to the Storage-Server-A 207A. The write request is a request to change the data in File-1 223. The replicate module 213A can increment (251) the counts in a change log 225 for File-1 223 to indicate the change being made to the local File-1 223 and being replicated to File-1 231 on Machine-B 203 and to File-1 241 on Machine-C 205. The change log 225 can be one of the extended attributes of the File-1 223. The replicate module 213A can increment the counts in the change log 225 by performing an extended attribute operation. For example, the current values in the change log 225 may be all zero values (e.g., (0,0,0)) and the replicate module 213 can perform an extended attribute operation to increase (251) the counts in the change log 225 to (1,1,1) to describe the changes (e.g., writes) to File-1 223 on Machine-A 201, to File-1 231 on Machine-B 203, and to File-1 241 on Machine-C 205.

The tracking module 215A in Storage-Server-A 207A can identify the extended attribute operation that is changing the counts in the change log 225 and can perform a read operation of the change log 225 to determine whether the current counts include all zero values or include at least one non-zero value. For example, the tracking module may determine (253) that the counts are (1,1,1) which include a non-zero value. When a change log (e.g. change log 225) includes a non-zero value, the tracking module 215A can add (255) the identifier of the file (e.g., identifier or File-1 223) to tracking data 227. The tracking data 227 can be stored in the data store 217A.

The replicate module 213A can propagate the change made to File-1 223 to copies of the file that are being managed by other storage servers (e.g., Storage-Server-B 207B, Storage-Server-C 207C). The replicate module 213A can send (257) an instruction to storage module 211B in Storage-Server-B 207B to change its local change log 233 to (1,1,1) and can send (259) an instruction to storage module 211C in Storage-Server-C 207C to change its local change log 243 to (1,1,1).

The storage module 211B on Storage-Server-B 207B can perform an extended attribute operation to increase (261) the counts in the change log 233 to (1,1,1) to describe the changes (e.g., writes) to File-1 223 on Machine-A 201, to File-1 231 on Machine-B 203, and to File-1 241 on Machine-C 205. The tracking module 215B in Storage-Server-B 207B can identify the extended attribute operation that is changing the counts in the change log 233 and can perform a read operation of the change log 233 to determine (263) that the counts are (1,1,1) which include a non-zero value. The tracking module 215B can add (265) the identifier of the file (e.g., identifier or File-1 231) to the tracking data 235 on Storage-Server-B 207B. The identifiers of the copies of the same file or the same directory may be the same. In one implementation, the identifiers are based on the UUID (universally unique identifier) standard. The tracking data 235 can be stored in the data store 217B.

The storage module 211C on Storage-Server-C 207C can perform an extended attribute operation to increase (267) the counts in the change log 243 to (1,1,1) to describe the changes (e.g., writes) to File-1 223 on Machine-A 201, to File-1 231 on Machine-B 203, and to File-1 241 on Machine-C 205. The tracking module 215C in Storage-Server-C 207C can identify the extended attribute operation that is changing the counts in the change log 243 and can perform a read operation of the change log 243 to determine (269) that the counts are (1,1,1) which include a non-zero value. The tracking module 215C can add (271) the identifier of the file (e.g., identifier or File-1 241) to the tracking data 245 on Storage-Server-C 207C. The tracking data 245 can be stored in the data store 217C.

The replicate module 213 can instruct (272) the storage module 211A to write to File-1 223 on Machine-A. The replicate module 213 can send (275) a request to the storage module 211B in Storage-Server-B 207B to make the same modification to File-1 231 in data store 217B that is coupled to Storage-Server-B 207B. The replicate module 213 can send (277) a request to the storage module 211C in Storage-Server-C 207C to make the same modification to File-1 241 in data store 217C that is coupled to Storage-Server-C 207C.

The storage module 211A can write (278) to File-1 223 as requested and can return (279) a successful write status to the replicate module 213 on Storage-Server-A 207A. The storage module 211B in Storage-Server-B 207B may successfully perform (281) the write operation on File-1 231 on Storage-Server-B 207B and can return (283) a successful write status to the replicate module 213 in Storage-Server-A 207A. The storage module 211C in Storage-Server-C 207C may successfully perform (285) the write operation on File-1 241 on Storage-Server-C 207C and can return (287) a successful write status to the replicate module 213 in Storage-Server-A 207A.

In one implementation, the replicate module 213 waits until a response is received for each write operation and performs an extended attribute operation to decrement (289) the count values in the change log 225 in Storage-Server-A 207A to (0,0,0) in response to the successful change operations performed by Storage-Server-A 207A, Storage-Server-B 207B, and Storage-Server-C 207C. In one implementation, the replicate module 213 can modify the change log 225 value accordingly as each response is received. The tracking module 215A can detect the extended attribute operation and can determine (290) that the current count values in the change log 225 are zero values and can remove (291) the identifier of the file (e.g., File-1 223) from the tracking data 227.

The replicate module 213 can send (292) an instruction to storage module 211B in Storage-Server-B 207B to change its local change log 233 to (0,0,0) and can send (293) an instruction to storage module 211C in Storage-Server-C 207C to change its local change log 243 to (0,0,0). The storage module 211B on Storage-Server-B 207B performs an extended attribute operation to decrement (294) the count values in the change log 233 in Storage-Server-B 207B to (0,0,0) in response to the successful change operations performed by Storage-Server-A 207A, Storage-Server-B 207B, and Storage-Server-C 207C. The tracking module 215B can detect the extended attribute operation and can determine (295) that the current count values in the change log 233 are zero values and can remove (296) the identifier of the file (e.g., File-1 231) from the tracking data 235. The storage module 211C on Storage-Server-C 207C performs an extended attribute operation to decrement (297) the count values in the change log 243 in Storage-Server-C 207C to (0,0,0) in response to the successful change operations performed by Storage-Server-A 207A, Storage-Server-B 207B, and Storage-Server-C 207C. The tracking module 215C can detect the extended attribute operation and can determine (298) that the current count values in the change log 243 are zero values and can remove (299) the identifier of the file (e.g., File-1 241) from the tracking data 245.

The tracking data 227,235,245 no longer includes the identifier, which may be a single identifier for the copies of File-1 223, File-1 231, and File-1 241 since the change operations are successful. One implementation of the tracking data including identifiers of file system objects (e.g., files, directories) that are related to unsuccessful change operations is described in greater detail below in conjunction with FIG. 3. The data stores 217A-C can be persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
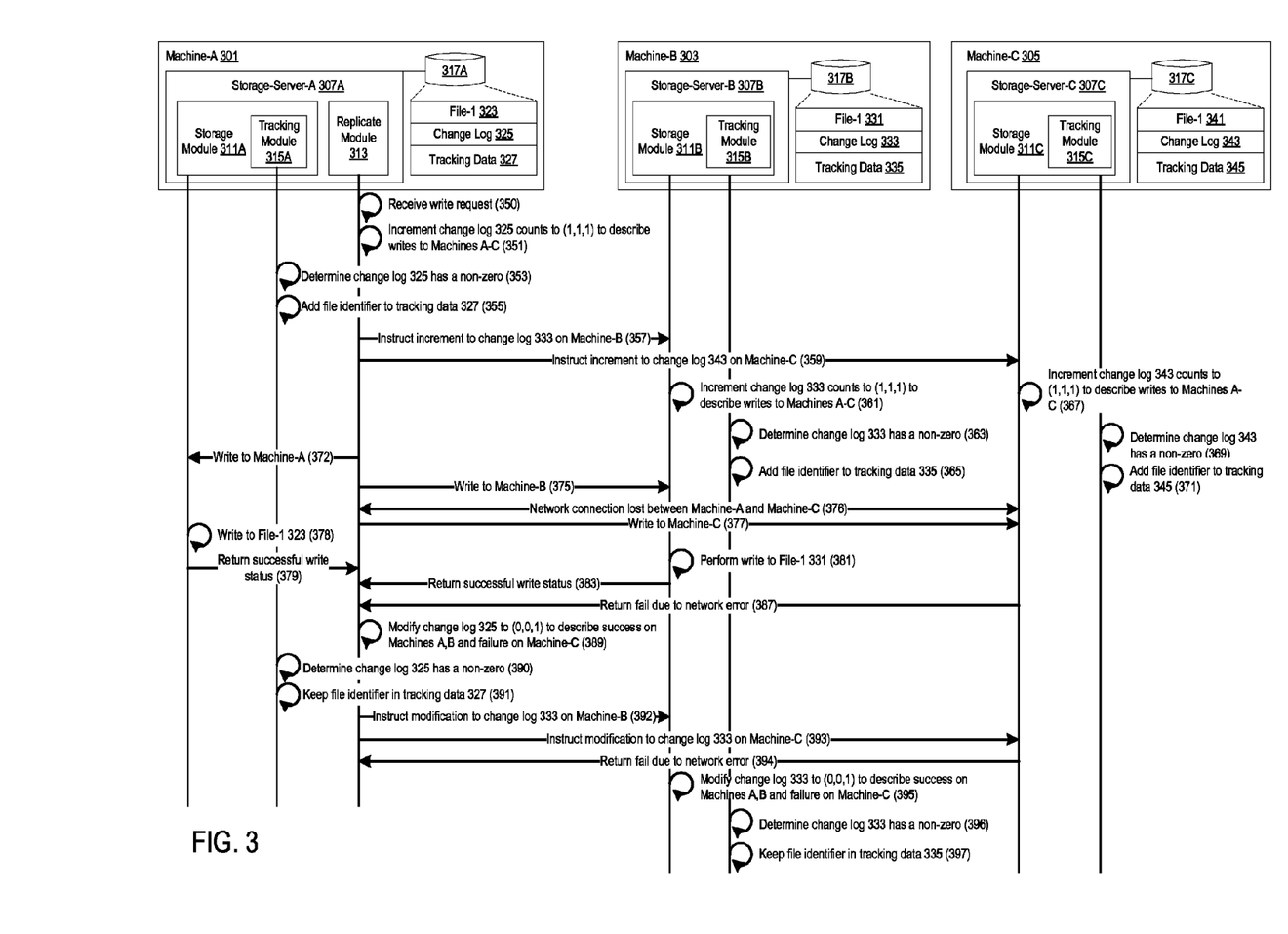
FIG. 3 is a block diagram of an implementation of a tracking module for tracking file systems objects related to successful and unsuccessful change operations.

FIG. 3 is a block diagram of an implementation of a tracking sub-modules 315A-C tracking file system objects (e.g., files, directories) that are being changed and having the change replicated to other storage servers. The machines 301,303,305 may correspond to the machines 140A-C of FIG. 1. The tracking sub-modules 315A-C may correspond to tracking sub-modules 127A-C in storage servers 143A-C in machines 140A-C of FIG. 1. Note that in alternative implementations, the functionality of one or more of the modules and/or sub-modules can be combined or divided.

The Storage-Server-A 307A can include a replicate module 313 that may receive (350) a write request from a file system client to write data to File-1 323 that is stored in a data store 317A that is coupled to the Storage-Server-A 307A. The replicate module 313A can increment (351) the counts in a change log 325 for File-1 323 to indicate the change being made to the local File-1 323 and being replicated to File-1 331 on Machine-B 303 and to File-1 341 on Machine-C 305. For example, the current values in the change log 325 may be all zero values (e.g., (0,0,0)) and the replicate module 313 can perform an extended attribute operation to increase (351) the counts in the change log 325 by one to (1,1,1) to represent the changes (e.g., writes) to File-1 323 on Machine-A 301, to File-1 331 on Machine-B 303, and to File-1 341 on Machine-C 305.

The tracking module 315A in Storage-Server-A 307A can identify the extended attribute operation that is changing the counts in the change log 325, may determine (353) that the counts are (1,1,1) which include a non-zero value, and may add (355) the identifier of the file (e.g., identifier or File-1 323) to tracking data 327. The tracking data 327 can be stored in the data store 317A. The replicate module 313A can send (357) an instruction to storage module 311B in Storage-Server-B 307B to change its local change log 333 to (1,1,1) and can send (359) an instruction to storage module 311C in Storage-Server-C 307C to change its local change log 343 to (1,1,1).

The storage module 311B on Storage-Server-B 307B can perform an extended attribute operation to increase (361) the counts in the change log 333 to (1,1,1) to describe the changes (e.g., writes) to File-1 323 on Machine-A 301, to File-1 331 on Machine-B 303, and to File-1 341 on Machine-C 305. The tracking module 315B in Storage-Server-B 307B can identify the extended attribute operation that is changing the counts in the change log 333, may determine (363) that the counts are (1,1,1), which include a non-zero value, and can add (365) the identifier of the file (e.g., identifier or File-1 331) to the tracking data 335 on Storage-Server-B 307B. The tracking data 335 can be stored in the data store 317B. The storage module 311C on Storage-Server-C 307C can perform an extended attribute operation to increase (367) the counts in the change log 343 to (1,1,1) to describe the changes (e.g., writes) to File-1 323 on Machine-A 301, to File-1 331 on Machine-B 303, and to File-1 341 on Machine-C 305. The tracking module 315C in Storage-Server-C 307C can identify the extended attribute operation that is changing the counts in the change log 343, may determine (369) that the counts are (1,1,1), which include a non-zero value, and can add (371) the identifier of the file (e.g., identifier or File-1 341) to the tracking data 345 on Storage-Server-C 307C. The tracking data 345 can be stored in the data store 317C.

The replicate module 313 can instruct (372) the storage module 311A to write to File-1 323 on Machine-A. The replicate module 313 can send (375) a request to the storage module 311B in Storage-Server-B 307B to make the same modification to File-1 331 in data store 317B. Machine-C 305 may experience a system failure that may result in a network connection being lost (376) between Machine-A 301 and Machine C 305. The replicate module 313 may attempt to send (377) a request to the storage module 311C in Storage-Server-C 307C to make the same modification to File-1 341 in data store 317C.

The storage module 311A can write (378) to File-1 323 as requested and can return (379) a successful write status to the replicate module 313 on Storage-Server-A 307A. The storage module 311B in Storage-Server-B 307B may successfully perform (381) the write operation on File-1 331 on Storage-Server-B 307B and can return (383) a successful write status to the replicate module 313 in Storage-Server-A 307A. Machine-C 305 may return (387) a fail status due to network error.

In one implementation, the replicate module 313 waits until a response is received for each write operation and performs an extended attribute operation to modify (389) the count values in the change log 325 in Storage-Server-A 307A to (0,0,1) in response to the successful change operations performed by Storage-Server-A 307A and Storage-Server-B 307B, and the failed change operation relating to Storage-Server-C 307C. In one implementation, the replicate module 313 can modify the change log 325 value accordingly as each response is received. The tracking module 315A can detect the extended attribute operation and can determine (390) that the current count values in the change log 325 include at least one non-zero value and can keep (391) the identifier of the file (e.g., File-1 323) from the tracking data 327.

The replicate module 313 can send (392) an instruction to storage module 311B in Storage-Server-B 307B to change its local change log 333 to (0,0,1) and can send (393) an instruction to storage module 311C in Storage-Server-C 307C to change its local change log 343 to (0,0,1). Machine-C 305 may return (395) a fail status due to network error. The storage module 311B on Storage-Server-B 307B performs an extended attribute operation to modify (395) the count values in the change log 333 in Storage-Server-B 307B to (0,0,1). The tracking module 315B can detect the extended attribute operation and can determine (396) that the current count values in the change log 333 include at least one non-zero value and can keep (397) the identifier of the file (e.g., File-1 331) from the tracking data 335.

The tracking data 327,335,345 keeps the identifier, which may be a single identifier for the copies of File-1 223, File-1 231, and File-1 241, since the change operation relating to Machine-C 305 was unsuccessful. In one implementation, the tracking data 327,335,345 is a list of identifiers of files and/or directories that are related to unsuccessful change operations. The tracking data 327,335,345 can be provided to a subsystem in the file system. For example, a pro-active self-healing module can use the tracking data 327,335,345 to determine which files and directories should be self-healed instead of having to crawl through the entire file system or an entire volume to check the individual change logs of the files and directories to determine whether a file and/or directory should be self-healed.

In one implementation, a file system component (e.g., self-healing subsystem, pro-active self-healing subsystem) can successfully self-heal a file and/or directory, and can perform an extended attribute operation to decrement the values of the change logs, for example, to (0,0,0), of the file and/or directory in response to the successful self-healing operation. The tracking module (e.g., tracking module 315A-C) can detect that the extended attribute operation and can determine that the current count values in the change log are all zero values. The tracking module can remove the object identifier from the tracking data.

The data stores 317A-C can be persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 4:
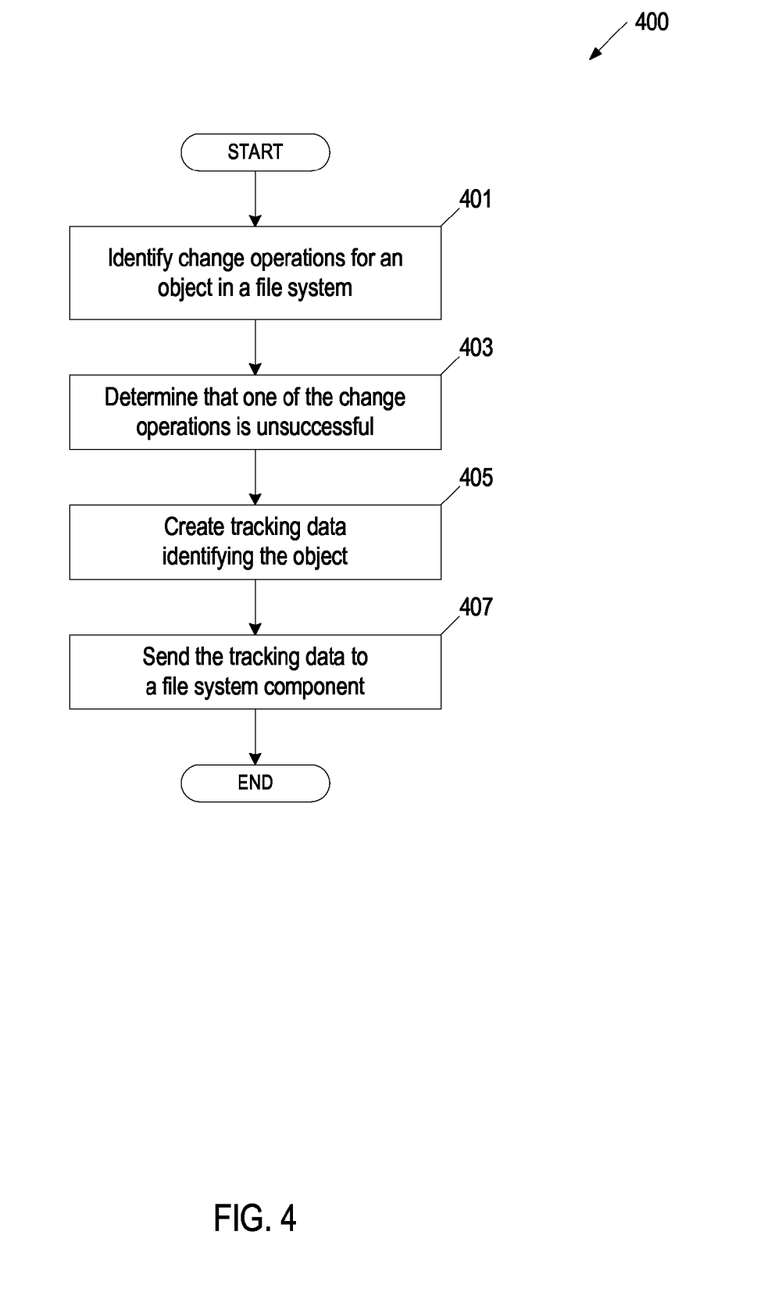
FIG. 4 is a flow diagram illustrating an implementation for a method for tracking file system objected related to successful and unsuccessful change operations.

FIG. 4 is a flow diagram of an implementation of a method 400 for tracking file system objects related to unsuccessful change operations. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a tracking module 127A-C in a storage server 143A-C in a machine 140A-C of FIG. 1.

At block 401, the server identifies change operations for an object in a file system. Examples of file system objects can include, and are not limited to, files, directories, sub-directories, etc. The change operations can include a change to a local copy of the object and a change to one or more remote copies of the object. Examples of a change operation can include, and are not limited to, creation of a file, deletion of a file, rename of a file, update to the content of a file, etc.

At block 403, the server determines that one of the change operations is unsuccessful. The server can determine that a change operation is unsuccessful by identifying an extended attribute operation for a change log of the object. The extend attribute operation is an operation to change the count values in the change log for the object. The extended operation can be a request to change the count values in a change log extended attribute for a particular file or directory. For example, the change log values can be increased or decreased. For example, when a change is to be made to File-1 and the change is to be replicated to copies of File-1, the server can perform an extended attribute operation to increase each element in the tuple count in the change log to reflect that the change is to be made and replicated. In another example, when a change has been successfully made and replicated, the server can perform an extended attribute operation to decrease each element in the tuple count by one in the change log to reflect the successful changes. The server can read the count values in the change log. If the server determines that the count values include at least one non-zero value, the server can determine that at least one change operation is unsuccessful.

At block 405, the server creates tracking data identifying the object that is associated with at least one unsuccessful change operation. The server can add the object identifier of the object to tracking data. In one implementation, the tracking data is a list of object identifiers of objects that are associated with failed change operations. In one implementation, the object identifiers are based on the universally unique identifier (UUID) standard. The word "unique" can mean "practically unique," "situationally unique," or "contextually unique." One implementation for adding the object identifier to the tracking data is described in greater detail below in conjunction with FIG. 5.

At block 407, the server can send the tracking data to a file system component. For example, the server can provide the tracking data to a self-healing subsystem (e.g., pro-active self-healing subsystem) that can use the tracking data to determine which files and/or directories should be self-healed instead of having to crawl through the entire file system or an entire volume to check the individual change logs of the files and directories to determine whether a file and/or directory should be self-healed. The self-healing subsystem can self-heal an object and can perform an extended attribute operation to modify the change log count values to reflect the self-healed object. For example, when a change operation fails for File-1, a self-healing module in the server can self-heal File-1 and can perform an extended attribute operation to decrement the counts in the change log for File-1 and the change logs for the copies of File-1 to reflect the successful self-healing operation. The server can identify the extended attribute operation related to the self-healing operation and read the current change log count values. The server may determine that the count values are all zero values and can update the tracking data by removing the object identifier from the tracking data. One implementation for removing the object identifier from the tracking data is described in greater detail below in conjunction with FIG. 5.

Figure 5:
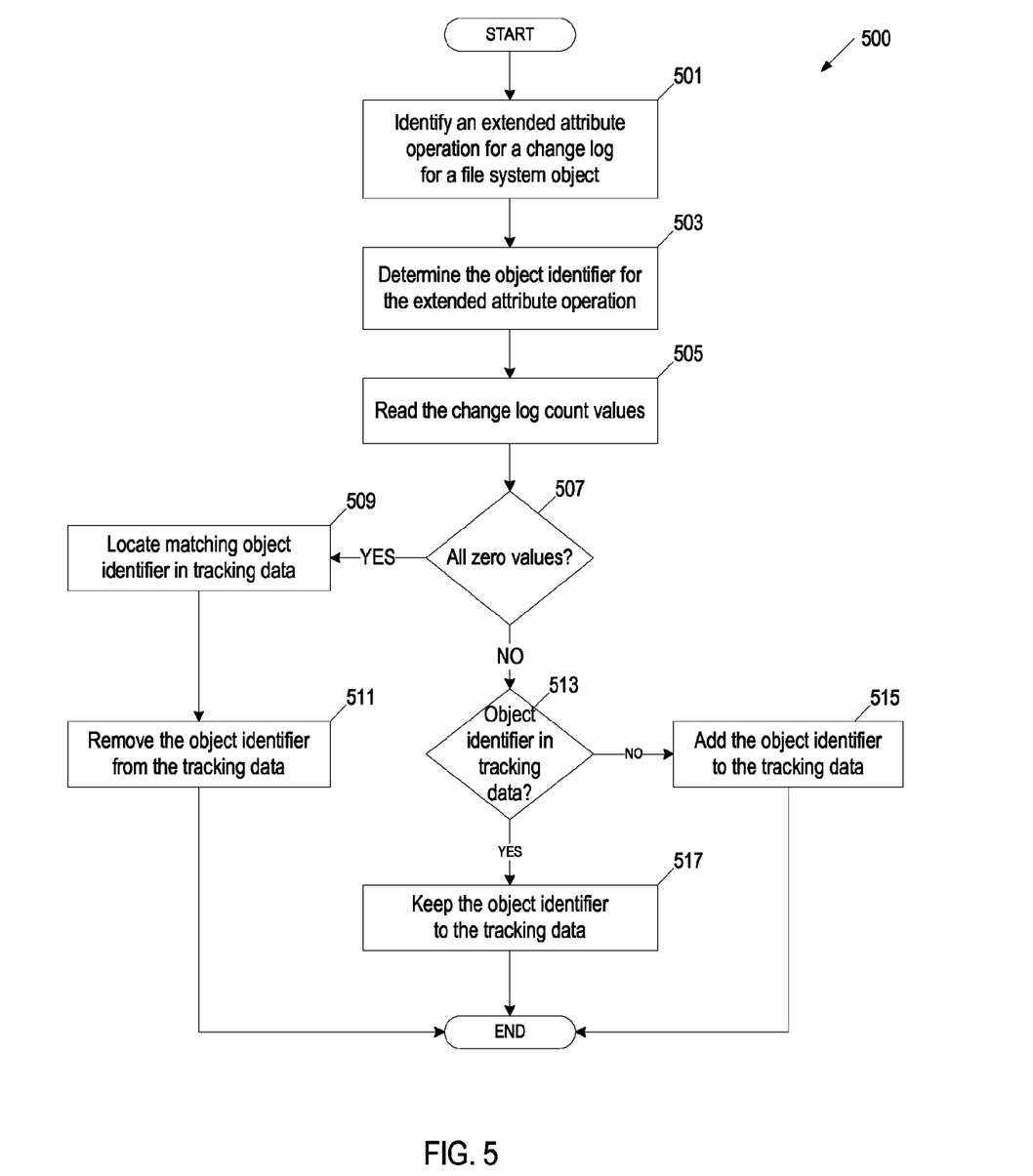
FIG. 5 is a flow diagram illustrating an implementation for a method for updating tracking data of file system objects associated with change operations.

FIG. 5 is a flow diagram of an implementation of a method 500 for updating tracking data relating to file system objects (e.g., files, directories) that are associated with change operations for file system objects. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a tracking module 127A-C in a storage server 143A-C in a machine 140A-C of FIG. 1.

At block 501, the server identifies an extended attribute operation for a change log of a file system object (e.g., file, directory). The extended attribute operation can be performed prior to a change operation being performed. For example, when a change is to be made to File-1 and the change is to be replicated to a copy of File-1, the server can perform an extended attribute operation to increment the counts in the change log to reflect the changes to be made and replicated. In another example, when a change has been made and replicated, the server can perform an extended attribute operation to decrement the counts in the change log to reflect the successful change operations. In another example, the extended attribute operation can be associated with a self-healing subsystem which is self-healing a file and/or directory that is associated with a failed change operation. For example, when a change operation fails for File-1, a self-healing module in the server can self-heal the File-1 and can perform an extended attribute operation to decrement the counts in the change log to reflect the successful self-healing operation to the File-1.

At block 503, the server determines the object identifier that corresponds the extended attribute operation. In one implementation, the object identifier is a file handle for a file or a directory handle for a directory. The handle (e.g., file handle, directory handle) can be based on the UUID (universally unique identifier) standard. A UUID is a 16-octet (128-bit) number. A UUID has a standard form that is represented by 32 hexadecimal digits, displayed in five groups separated by hyphens, in the form 8-4-4-4-12 for a total of 36 characters (32 digits and four hyphens). For example, the file handle may be a UUID of "550e8400-e29b-41d4-a716-446655440000".

At block 505, the server reads the change log count values. The server can perform a read operation on the extended attribute that corresponds to the change log for the object. An object (e.g., file, directory) can have one or more extended attributes that are stored as part of the object. If the count values are all zero values (block 507), the server locates an object identifier in the tracking data that matches the object identifier for the extended attribute operation at block 509. At block 511, the server removes the matching object identifier from the tracking data. If the count values are not all zero values (block 507), the server searches the tracking data for an object identifier that matches the object identifier for the extended attribute operation. If there is not an object identifier in the tracking data that matches the object identifier for the extended attribute operation (block 513), the server adds the object identifier to the tracking data at block 515. If there is an object identifier in the tracking data that matches the object identifier for the extended attribute operation (block 513), the server keeps the object identifier in the tracking data at block 517.

Figure 6:
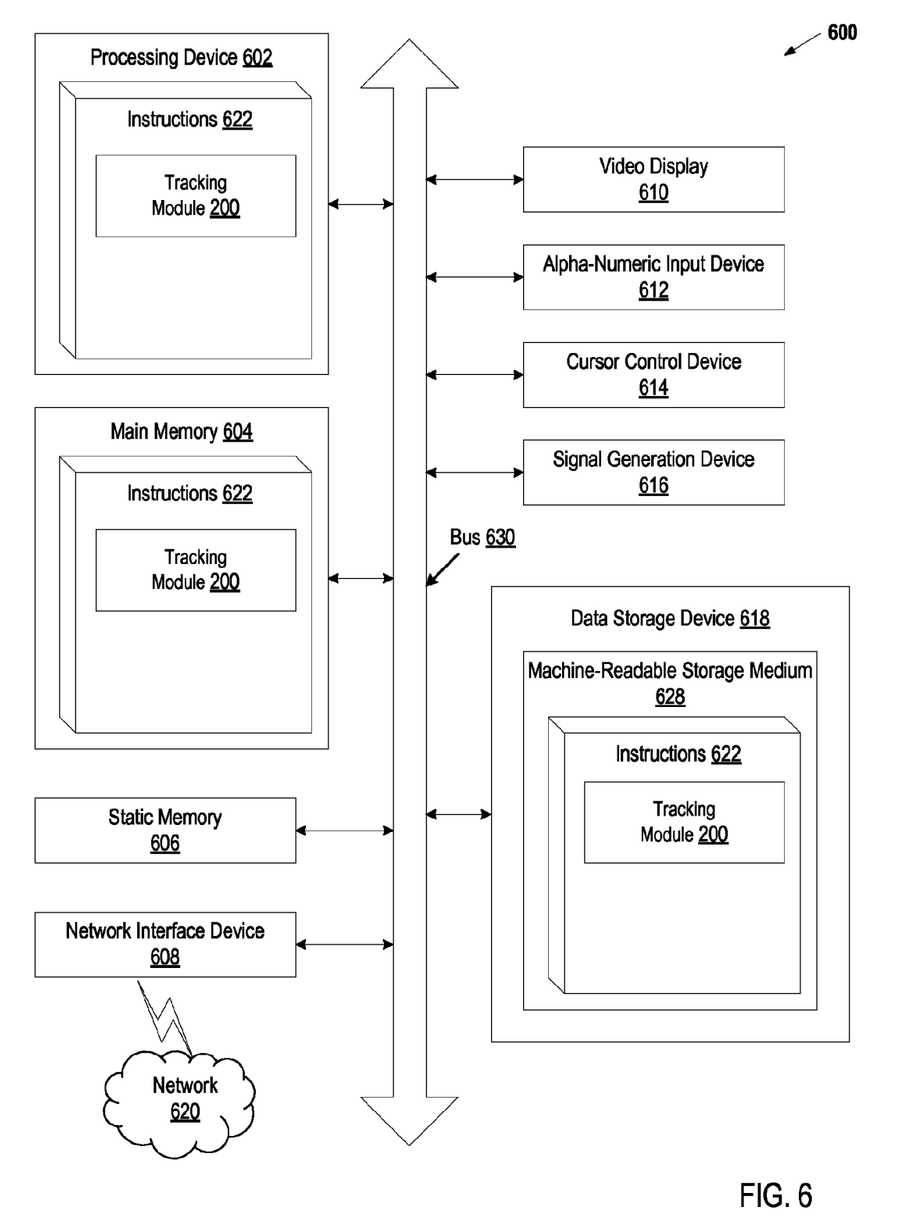
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a tracking module (e.g., tracking module 215A-C of FIG. 2), and/or a software library containing methods that call modules in a tracking module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "creating" or "adding" or "sending" or "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
identifying a plurality of change operations for an object in a file system, the object being a file or a directory, the plurality of change operations comprising a change to a local copy of the object and a remote copy of the object;
determining that one of the plurality of change operations is unsuccessful;
creating a change log comprising count values for the local copy and the remote copy in view of the determination that one of the plurality of change operations is unsuccessful; and
creating, by a processing device, tracking data identifying the object that is associated with the one of the plurality of change operations that is unsuccessful in view of the count values.

2. The method of claim 1, wherein determining that one of the plurality of change operations is unsuccessful comprises:
identifying an extended attribute operation affecting the count values for the local copy and the remote copy of the object, the extended attribute operation being associated with the plurality of change operations pertaining to the object;
determining the count values; and
determining that the count values comprise a non-zero value.

3. The method of claim 2, wherein creating the tracking data comprises:
adding an identifier of the object to the tracking data in response to determining that the count values for the local copy and the remote copy of the object comprise a non-zero value.

4. The method of claim 1, further comprising:
sending the tracking data to a self-healing subsystem.

5. The method of claim 4, further comprising:
identifying an extended attribute operation affecting the count values for the local copy and the remote copy of the object, the extended attribute operation being associated with a self-healing operation pertaining to the object;
determining the count values;
determining that the count values comprise a zero value; and
removing an identifier of the object from the tracking data.

6. The method of claim 1, wherein the tracking data comprises an object identifier associated with failed change operations.

7. The method of claim 1, wherein the tracking data comprises an identifier that is based on the universally unique identifier (UUID) standard.

8. A non-transitory computer-readable storage medium including instructions that, when executed by a processing device, cause the processing device to perform operations comprising:
identifying a plurality of change operations for an object in a file system, the object being a file or a directory, the plurality of change operations comprising a change to a local copy of the object and a remote copy of the object;

determining that one of the plurality of change operations is unsuccessful;

creating a change log comprising count values for the local copy and the remote copy in view of the determination that one of the plurality of change operations is unsuccessful; and creating, by the processing device, tracking data identifying the object that is associated with the one of the plurality of change operations that is unsuccessful in view of the count values.

9. The non-transitory computer-readable storage medium of claim 8, wherein determining that one of the plurality of change operations is unsuccessful comprises:

identifying an extended attribute operation affecting the count values for the local copy and the remote copy of the object, the extended attribute operation being associated with the plurality of change operations pertaining to the object;

determining the count values; and determining that the count values comprise a non-zero value.

10. The non-transitory computer-readable storage medium of claim 9, wherein creating the tracking data comprises:

adding an identifier of the object to the tracking data in response to determining that count values for the local copy and the remote copy of the object comprise a non-zero value.

11. The non-transitory computer-readable storage medium of claim 8, the operations further comprising:

sending the tracking data to a self-healing subsystem.

12. The non-transitory computer-readable storage medium of claim 11, the operations further comprising:

identifying an extended attribute operation affecting the count values in a change log for the local copy and the remote copy of the object, the extended attribute operation being associated with a self-healing operation pertaining to the object;

determining the count values;

determining that the count values comprise a zero value; and removing an identifier of the object from the tracking data.

13. The non-transitory computer-readable storage medium of claim 8, wherein the tracking data comprises an object identifier associated with failed change operations.

14. A system comprising:

a memory;

a processing device coupled to the memory to:

identify a plurality of change operations for an object in a file system, the object being a file or a directory, the plurality of change operations comprising a change to a local copy of the object and a remote copy of the object;

determine that one of the plurality of change operations is unsuccessful;

create a change log comprising count values for the local copy and the remote copy in view of the determination that one of the plurality of change operations is unsuccessful; and create tracking data identifying the object that is associated with the one of the plurality of change operations that is unsuccessful in view of the count values.

15. The system of claim 14, wherein determining that one of the plurality of change operations is unsuccessful comprises:

identifying an extended attribute operation affecting the count values for the local copy and the remote copy of the object, the extended attribute operation being associated with the plurality of change operations pertaining to the object;

determining the count values; and determining that the count values comprise a non-zero value.

16. The system of claim 15, wherein creating the tracking data comprises:

adding an identifier of the object to the tracking data in response to determining that the count values for the local copy and the remote copy of the object comprise a non-zero value.

17. The system of claim 14, wherein the processing device is further to:

send the tracking data to a self-healing subsystem.

18. The system of claim 17, wherein the processing device is further to:

identify an extended attribute operation affecting the count values for the local copy and the remote copy the object, the extended attribute operation being associated with a self-healing operation pertaining to the object;

determine the count values;

determine the count values comprise a zero value; and remove an identifier of the object from the tracking data.

19. The system of claim 14, wherein the tracking data comprises an object identifier associated with failed change operations.

20. The system of claim 14, wherein the tracking data comprises an identifier that is based on the universally unique identifier (UUID) standard.

* * * * *